Aug. 14, 1934.
H. E. IVES
1,970,310
ELECTROOPTICAL SYSTEM
Filed Nov. 7, 1930
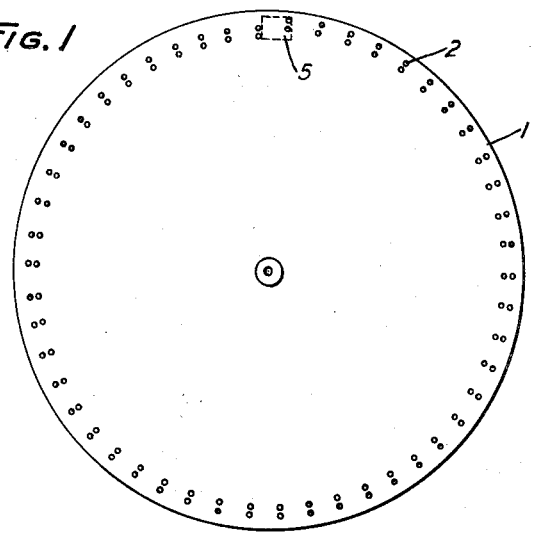
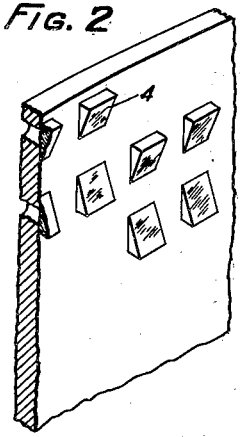
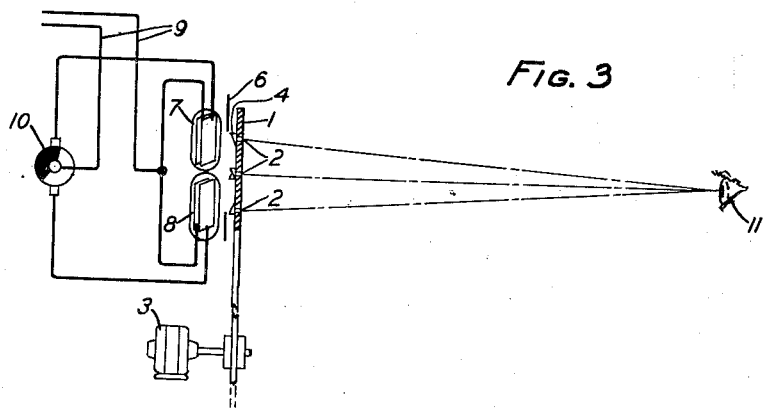
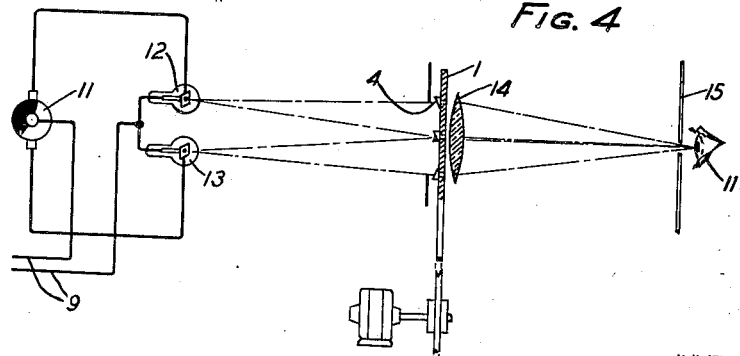
INVENTOR
H. E. IVES
BY
ATTORNEY Patented Aug. 14, 1934

1,970,310

UNITED STATES PATENT OFFICE

1,970,310

ELECTROOPTICAL SYSTEM

Herbert E. Ives, Montclair, N. J., assignor to Bell Telephone Laboratories, Incorporated, New York, N. Y., a corporation of New York Application November 7, 1930, Serial No. 494,056

4 Claims. (Cl. 178—6)

This invention relates to electro-optical systems and more particularly to systems for producing television images.

An object of the invention is to provide efficient means for utilizing a plurality of electric lamps in association with scanning means for producing an image in response to currents impressed upon the lamps.

In a well known form of television image producing system the incoming image currents are impressed upon a neon lamp having an extended luminous field of substantially uniform illumination. An apertured scanning disc is rotated immediately in front of the lamp and the luminous field of the lamp is viewed through the apertures of the disc, which are arranged in a spiral. The luminous field of the lamp is thus scanned in successive adjacent lines synchronously with the scanning of the field at the transmitting station. An image of the object scanned at the transmitter is thereby formed upon the retina of the eye of the observer. Since the lamp is close to the scanning disc the observer may see the luminous field with both eyes from various positions in front of the scanning disc. It has been found that the brightness of the luminous field of the lamp is increased by decreasing its size. This appears to be due to the greater current density which it is possible to obtain with the smaller lamps whose electrodes can be much closer together without encountering mechanical difficulties in construction. Even if large lamps constructed with their electrodes close together can be satisfactorily produced, the current which the large lamps will use to obtain the same current density will be quite large. In accordance with the present invention a plurality of relatively small lamps can be utilized in place of a single large lamp. This is accomplished by placing the small lamps side by side in the position of the large lamp, the luminous field of each of the small lamps being of a size and shape to correspond to a fractional part of the luminous field of the large lamp. The apertures of the scanning disc are then so arranged that the luminous fields of the lamps are scanned in succession. Preferably the scanning disc has a plurality of spirals of apertures one for each lamp, the apertures forming a continuous multiple spiral, this having the advantage that a smaller disc can be used than when a single spiral is used. The lamps could be simultaneously illuminated in accordance with the instantaneous aspect of successive elemental areas of the object field at the transmitter by simultaneously energizing them by means of the incoming image currents. This would have the disadvantage, however, that the energy of the incoming currents is uselessly divided among the lamps since only one lamp is scanned at a time. A distributor is therefore provided for cutting in each lamp in succession while the corresponding portion of the transmitting field is being scanned. It is not practical however to make a lamp in which the luminous field extends to the extreme edge of the lamp so that the luminous fields of the lamps must be at least slightly separated. The image produced is therefore divided into sections separated by spaces. To overcome this disadvantage small optical prisms are associated with the apertures of the scanning disc respectively, the prisms associated with the apertures for each lamp being of such angle or angles as to scan only the luminous field of that lamp or the portion thereof which is utilized. By giving these prisms appropriate angles which progressively increase or decrease from aperture to aperture, the apparent size of the field of the lamp may be increased, thus permitting a somewhat smaller lamp to be used at a somewhat greater distance from the scanning disc and still permit the observer to view the field with both eyes and from various positions in front of the scanning disc. When two lamps are employed the preferred arrangement is to have the prisms of one spiral reversed from those of the other spiral. The lamps may be placed a considerable distance apart if desired.

The embodiment of the invention herein chosen for purposes of illustration will now be described in detail, reference being made to the accompanying drawing in which:

Fig. 1 is a front view in elevation of a scanning disc in accordance with the invention;

Fig. 2 is an enlarged sectional detailed view of the scanning disc of Fig. 1 viewed from the rear;

Fig. 3 is a diagrammatic showing of an image producing system in accordance with the invention; and Fig. 4 is a modification of the arrangement of Fig. 3.

Referring to Figs. 1, 2 and 3 a scanning disc 1 having a double spiral of apertures 2 is driven by a suitable means such as motor 3. Each aperture is covered with a small optical prism 4. The field 5 to be scanned is defined by the opening in a plate 6. Back of the plate 6 are two lamps 7 and 8 which may be of the well known form of neon glow discharge lamp having parallel plate electrodes, the luminous field being formed on the surface of the cathode which is viewed. Incoming currents are supplied over circuit 9—9 to lamps 7 and 8 in succession. The successive operation is effected by means of rotary distributor 10 which may be driven in any suitable manner as by being coupled to motor 3 through a suitable gearing. The observer may be stationed at point 11.

The operation of this system is as follows. As disc 1 rotates one aperture of each spiral is at any one time effective. Assume that this is the first aperture of each spiral as shown in Fig. 1. The prism 4 covering the first aperture of the outermost spiral as it passes across the field directs light from a horizontal strip of the luminous field of lamp 7 to the eye at 11, the commutator 10 being then in a position to associate the lamp 7 with the line 9—9. The prism which covers the first aperture of the second spiral is at the same time of such an angle and so arranged that if the lamp 8 were luminous a corresponding line across its luminous field would be visible at 11. The prisms covering the apertures of the first spiral thus successively pass across the field and direct light from the lamp 7 to the eye during one complete rotation of the scanning disc. During the succeeding rotation lamp 7 becomes dark and the prisms of the innermost spiral of apertures direct light from the luminous field of lamp 8 to the eye, commutator 10 disassociating lamp 7 with line 9 and associating lamp 8 with line 9 at the instant that the first rotation of the scanning disc is complete. Thus each lamp produces a light for the production of one half of the image.

The invention is not limited to the use of two lamps only since obviously a larger number may be used if desired, a corresponding number of spirals being employed and the commutator 10 being designed to associate the lamps in succession with the line 9—9.

It is desirable that the observer be able to observe with both eyes and not be restricted to a single position. This can be done by placing the lamps 7 and 8 relatively close to the disc 1. By properly choosing the angles of the prisms the apparent vertical dimensions of the luminous field of each lamp can be made greater than the actual vertical dimensions of the field, the angles of the prisms being successively smaller from the center of the double spiral toward the two extremities. At the same time the angles of the prisms must be so chosen that only the luminous fields of the lamp are scanned and not the intervening space.

Referring to Fig. 4 the modification is illustrated in which substantially point sources of light 12 and 13 are substituted for the lamps 7 and 8 of Fig. 3. Lens 14 is so placed as to focus at the point of observation 11 a point mid-way between lamps 12 and 13. The prisms 4 shift the point which is focussed to the luminous spot of lamp 12 and that of lamp 13 successively as the commutator 10 associates these lamps with line 9. In this arrangement the point of observation can not be changed so that an apertured baffle 15 is provided. If desired, however, lamps having fields of considerable area may be substituted for lamps 12 and 13, in which case the point of observation may be moved, within limits.

While a form of the invention has been described in which the scanning element is a disc it is obvious that other forms of scanning mechanism may be employed, the underlying idea being to employ optical prisms with the scanning mechanism in such manner that the portions of the image reduced by light from the various lamps will be directly joined without the necessity of having the luminous fields of the lamps so joined.

What is claimed is:

1. Image producing means comprising two lamps having their luminous fields spaced apart, a rotating scanning element having a double spiral of apertures therein for directing light from said fields in succession to produce an image, means for rendering said lamps effective in succession, and optical prisms associated with said apertures respectively, each of the prisms in each spiral being of different angles than each of the other prisms of that spiral.

2. Image producing means comprising two lamps having their luminous fields spaced apart, an apertured scanning disc for directing light from said fields in succession to produce an image, said apertures being in the form of a double spiral, a distributor for directing image currents to each of said lamps in succession to render them effective in succession, and optical prisms associated with said apertures respectively for causing the portion of the image produced by light from one of said fields to join the portion produced from the other of said fields without any intervening space, each of said prisms of each spiral being of different angle from each of the other prisms of that spiral.

3. Television receiving station apparatus comprising a rotatable member having apertures in the form of a multiple-turn spiral, means adjacent the paths of said apertures for defining a field of view, a plurality of lamps adjacent one portion only of the paths of said apertures, one for each complete spiral of apertures, each lamp having a luminous area of considerable size, means for impressing incoming image currents upon said lamps in succession, and non-diffusing light directing elements of small size and mass aligned with said apertures respectively and mounted upon said rotatable member so as to lie closely adjacent thereto throughout and movable therewith for directing beams therefrom along overlapping paths to the same region in space, which region is considerably larger than the pupil of the eye of an observer, whereby when an observer positions his eye anywhere within said region and views said field he appears to see the object scanned at the transmitting station.

4. Television receiving station apparatus comprising a rotatable member having apertures in the form of a multiple-turn spiral, means adjacent the path of said apertures for defining a field of view, a plurality of lamps, one for each complete spiral of apertures, each lamp having a luminous area of considerable size, means for impressing incoming image currents upon said lamps in succession, and optical prisms associated with said apertures respectively for directing beams therefrom along overlapping paths to the same region in space, which region is considerably larger than the pupil of the eye of an observer, whereby when an observer positions his eye anywhere within said region and views said field he appears to see the object scanned at the transmitting station.

HERBERT E. IVES.